United States Patent
Fukuda et al.

(10) Patent No.: US 10,400,195 B2
(45) Date of Patent: Sep. 3, 2019

(54) GEL COMPOSITION

(71) Applicant: DAI-ICHI KOGYO SEIYAKU CO., LTD., Kyoto-shi (JP)

(72) Inventors: Natsu Fukuda, Kyoto (JP); Masatake Joyabu, Kyoto (JP)

(73) Assignee: DAI-ICHI KOGYO SEIYAKU CO., LTD., Kyoto-shi (JP)

( * ) Notice: Subject to any disclaimer, the term of this patent is extended or adjusted under 35 U.S.C. 154(b) by 0 days.

(21) Appl. No.: 15/559,743

(22) PCT Filed: Jun. 15, 2017

(86) PCT No.: PCT/JP2017/022085
§ 371 (c)(1),
(2) Date: Sep. 19, 2017

(87) PCT Pub. No.: WO2018/042823
PCT Pub. Date: Mar. 8, 2018

(65) Prior Publication Data
US 2018/0346847 A1 Dec. 6, 2018

(30) Foreign Application Priority Data
Sep. 2, 2016 (JP) .................. 2016-171979

(51) Int. Cl.
| | |
|---|---|
| C11D 1/722 | (2006.01) |
| C11D 3/37 | (2006.01) |
| B01J 13/00 | (2006.01) |
| C11D 3/20 | (2006.01) |
| C11D 3/28 | (2006.01) |
| C08G 65/26 | (2006.01) |
| C11D 17/00 | (2006.01) |

(52) U.S. Cl.
CPC ............ *C11D 3/3707* (2013.01); *B01J 13/00* (2013.01); *B01J 13/0065* (2013.01); *C08G 65/2609* (2013.01); *C11D 1/722* (2013.01); *C11D 3/20* (2013.01); *C11D 3/28* (2013.01); *C11D 17/003* (2013.01); *C08G 2210/00* (2013.01)

(58) Field of Classification Search
CPC ...... C11D 1/722; C11D 17/003; C11D 17/043
See application file for complete search history.

(56) References Cited

U.S. PATENT DOCUMENTS

| | | | |
|---|---|---|---|
| 2010/0081607 A1 | 4/2010 | Varineau et al. | |
| 2012/0208738 A1 | 8/2012 | Nomura et al. | |

FOREIGN PATENT DOCUMENTS

| | | | | |
|---|---|---|---|---|
| JP | 05-179129 A | 7/1993 | | |
| JP | 2010-047656 A | 3/2010 | | |
| JP | 2011-057780 A | 3/2011 | | |
| JP | 2013-032437 | * 2/2013 | ............ | C11D 1/72 |
| JP | 2013-032437 A | 2/2013 | | |
| SG | 184336 A | 11/2012 | | |

OTHER PUBLICATIONS

Office Action dated Feb. 1, 2017 in Japanese Patent Application No. 2016-171979 (submitting partial English translation only).

* cited by examiner

*Primary Examiner* — Brian P Mruk
(74) *Attorney, Agent, or Firm* — Oblon, McClelland, Maier & Neustadt, L.L.P.

(57) ABSTRACT

A gel composition having high adhesion, high whitening resistance, and high high-temperature stability is provided. The gel composition includes a polyoxyalkylene alkyl ether (A) represented by general formula (1) and water (B).

R—O—(PO)$_m$-(EO)$_n$—H     (1)

In the formula (1), R is a linear alkyl group having 12 to 22 carbon atoms, PO represents an oxypropylene group, EO represents an oxyethylene group, m and n each represent an average number of moles added, m is a number of 1 to 20, and n is a number of 1 to 80. PO and EO are added in a configuration of block addition.

20 Claims, No Drawings

GEL COMPOSITION

CROSS-REFERENCE TO RELATED APPLICATIONS

This application is the U.S. National Stage of International Patent Application No. PCT/JP2017/022085, filed Jun. 15, 2017. This application claims priority to Japanese Patent Application No. 2016-171979, filed Sep. 2, 2016.

TECHNICAL FIELD

The present invention relates to a gel composition that can be used as a cleaner for hard surfaces in toilets, bathrooms, kitchens, and other places, and to a cleaner including the gel composition.

BACKGROUND ART

Conventionally, cleaners of a type that is placed, for example, on an upper surface of a water tank of a toilet and gradually releases a cleaning component into a toilet bowl have been widely used. In recent years, however, tankless toilets have been increasingly used, and there is a need for toilet cleaners applicable to tankless toilets.

As such toilet cleaners, aqueous gel cleaner compositions that can be attached to inner hard surfaces of toilet bowls are proposed.

For example, PTL 1 discloses a gel cleaner composition that contains, as an essential component, a polyoxyethylene alkyl ether having a given structure.

PTL 2 discloses a gel cleaner composition that contains, as essential components, a polyoxyethylene alkyl ether having a given structure and ethanol and that has a specified viscosity.

PTL 3 describes a cleaner composition that contains, as essential components, a specific polyalkylene glycol, calcium chloride and/or magnesium chloride, and water.

However, conventional gel compositions as described in PTL 1 and 2 disadvantageously tend to lose their surface transparency upon drying and, moreover, become hardened or less soluble.

To address these problems such as opacification (whitening) upon drying, PTL 3 proposes improving the surface drying by adding calcium chloride and/or magnesium chloride. However, adding these salts disadvantageously makes it difficult to add an anionic surfactant or an amphoteric surfactant, which imposes restrictions on product design.

Ideally, a gel cleaner composition remains attached until it is completely released. However, conventional gel cleaner compositions disadvantageously have poor stability at high temperatures, and, for example, when the temperature in a toilet is considerably high in summer, such a gel cleaner composition tends to soften or liquefy to be less adhesive and likely to detach from a surface to which the composition have been attached.

CITATION LIST

Patent Literature

PTL 1: Japanese Unexamined Patent Application Publication No. 2011-57780

PTL 2: Japanese Unexamined Patent Application Publication No. 2011-219645

PTL 3: Japanese Unexamined Patent Application Publication No. 2013-32437

SUMMARY OF INVENTION

Technical Problem

In view of the foregoing, an object of the present invention is to provide a gel composition that has high adhesion and high whitening resistance and further has high high-temperature stability even when calcium chloride or magnesium chloride is not contained. Another object of the present invention is to provide a hard surface cleaner composition containing the gel composition and having the above properties.

Solution to Problem

To solve the problems described above, a gel composition according to the present invention contains a polyoxyalkylene alkyl ether (A) represented by general formula (1) and water (B).

$$R-O-(PO)_m-(EO)_n-H \quad (1)$$

In the formula (1), R is a linear alkyl group having 12 to 22 carbon atoms, PO represents an oxypropylene group, EO represents an oxyethylene group, m and n each represent an average number of moles added, m is a number of 1 to 20, and n is a number of 1 to 80. PO and EO are added in a configuration of block addition.

The polyoxyalkylene alkyl ether (A) may be contained in an amount of 10% to 50% by mass.

The water (B) may be contained in an amount of 35% to 75% by mass.

The ratio of m to n (m/n) in the general formula (1) may be 0.02 to 0.50 by mole.

The sum of m and n (m+n) in the general formula (1) may be 5 to 100.

A hard surface cleaner of the present invention contains the above-described gel composition.

Advantageous Effects of Invention

According to the present invention, a gel composition can be provided that not only has an adhesion required for a gel cleaner but also has high whitening resistance and moreover high high-temperature stability even when calcium chloride or magnesium chloride is not contained.

A hard surface cleaner composition of the present invention obtained using the gel composition has the above properties, and when calcium chloride or magnesium chloride is not used, an anionic surfactant or an amphoteric surfactant can be added, which increases the degree of freedom in product design.

DESCRIPTION OF EMBODIMENTS

Embodiments of the present invention will now be described in detail.

A gel composition of the present invention contains a polyoxyalkylene alkyl ether (A) represented by general formula (1) and water (B).

$$R-O-(PO)_m-(EO)_n-H \quad (1)$$

In the formula (1), R is a linear alkyl group having 12 to 22 carbon atoms; 12 or more carbon atoms facilitate gel formation and provide a gel with high strength, and 12 to 22 carbon atoms provide high high-temperature stability. The number of carbon atoms in R is more preferably 14 to 20, still more preferably 16 to 18. When R is a linear alkyl group, increased gel strength and improved adhesion are provided.

PO represents an oxypropylene group, and m represents an average number of moles of oxypropylene group added. m may be any value from 1 to 20, but is preferably 2 to 15. When the value of m is 20 or less, the desired gel strength can be maintained, which enables constant gel properties. When the value of m is 1 to 20, whitening due to drying of the surface of the gel composition can be inhibited, and high adhesion and high high-temperature stability are provided.

EO represents an oxyethylene group, and n represents an average number of moles of oxyethylene group added. n may be any value from 1 to 80, but is preferably 5 to 75, more preferably 10 to 70. When the value of n is 1 to 80, a good balance is achieved between stability at high temperatures and workability during gel production.

PO and EO are added in a configuration of block addition. When PO and EO are added in a configuration of block addition, increased gel strength and improved adhesion are provided.

The ratio of m to n may be any value, but m/n (molar ratio) is preferably 0.02 to 0.50, more preferably 0.05 to 0.40, still more preferably 0.08 to 0.34. When m/n (molar ratio) is 0.02 to 0.50, higher whitening resistance is provided.

The total number of moles of propylene oxide and ethylene oxide added (m+n) may be any value, but is preferably 5 to 100, more preferably 10 to 90, still more preferably 20 to 80, particularly preferably 35 to 70. When the total number of moles added (m+n) is 5 to 100, higher adhesion is provided.

The polyoxyalkylene alkyl ether (A) for use may be prepared by any known method or may be a commercially available product.

The amount of the polyoxyalkylene alkyl ether (A) in the gel composition may be any amount, but is preferably 10% to 50% by mass, more preferably 15% to 40% by mass. When the amount is 10% to 50% by mass, higher gel strength, higher whitening resistance, higher adhesion, and higher high-temperature stability are provided.

The amount of the water (B) in the gel composition may be any amount, but is preferably 35% to 75% by mass. When the amount is 35% to 75% by mass, higher gel strength and higher adhesion are provided.

The amount of the water (B) relative to the amount of the polyoxyalkylene alkyl ether (A) may be any amount, but is preferably 30 to 500 parts by mass, more preferably 40 to 400 parts by mass, still more preferably 50 to 300 parts by mass, relative to 100 parts by mass of the polyoxyalkylene alkyl ether (A). Within this range, higher gel strength and higher adhesion are provided.

The gel composition of the present invention may contain one or more additives such as surfactants including nonionic surfactants other than (A), anionic surfactants, cationic surfactants, and amphoteric surfactants, perfumes, dyes, and solvents other than water, to the extent that the effects of the present invention are not adversely affected. The amount (the total amount, when two or more additives are used in combination) of these additives may be any amount, but is preferably 0% to 50% by mass.

Examples of nonionic surfactants include, but are not limited to, glycerol fatty acid esters such as glyceryl monostearate and glyceryl monooleate; polyoxyethylene glycerol fatty acid esters such as POE (polyoxyethylene) glyceryl monostearate and POE glyceryl monooleate; polyglycerol fatty acid esters such as diglyceryl monostearate; sorbitan fatty acid esters such as sorbitan monolaurate, sorbitan sesquistearate, and sorbitan monooleate; polyoxyethylene sorbitan fatty acid esters such as POE sorbitan monococoate, POE sorbitan tristearate, and POE sorbitan trioleate; polyethylene glycol fatty acid esters such as polyethylene glycol monolaurate, polyethylene glycol monostearate, polyethylene glycol monooleate, and polyethylene glycol distearate; polyhydric alcohol alkyl ethers such as glycerol monooctyl ether, glycerol monostearyl ether, and pentaerythritol monododecyl ether; polyoxyethylene alkyl ethers such as POE lauryl ether, POE cetyl ether, and POE stearyl ether; polyoxyethylene polyoxypropylene alkyl ethers such as POE-POP (polyoxypropylene) cetyl ether and POE-POP decyltetradecyl ether; polyoxyethylene alkyl amines such as POE stearyl amine and POE oleyl amine; and alkyl polyglucosides.

Examples of anionic surfactants include, but are not limited to, fatty acid salts such as raw materials for soaps, sodium laurate, sodium palmitate, and potassium cocoate soap; alkyl ether carboxylates such as POE lauryl ether carboxylate; alkyl sulfates such as sodium lauryl sulfate, potassium lauryl sulfate, and triethanolamine lauryl sulfate; alkyl ether sulfates such as triethanolamine POE lauryl sulfate and sodium POE lauryl sulfate; phosphates such as sodium POE oleyl ether phosphate, POE stearyl ether phosphate, and sodium POE laurylamide ether phosphate; sulfosuccinates such as sodium di-2-ethylhexyl sulfosuccinate and disodium polyoxyethylene lauryl sulfosuccinate; alkylbenzene sulfonates such as sodium dodecylbenzene sulfonate and triethanolamine dodecylbenzene sulfonate; and sodium hydrogenated coconut oil fatty acid glycerol sulfate, sulfonated oils such as Turkey-red oil, α-olefin olefin sulfonates, and higher fatty acid ester sulfonates.

Examples of cationic surfactants include, but are not limited to, quarternary ammonium salt surfactants such as cetyltrimethylammonium chloride, stearyltrimethylammonium chloride, didecyldimethylammonium chloride, distearyldimethylammonium chloride, cetylpyridinium chloride, and alkyldimethylbenzylammonium chloride; amidoamine salt cationic surfactants such as stearic acid diethylaminoethylamide glutamate and lanolin fatty acid diethylaminoethylamide glutamate; and lauramide guanidine hydrochloride.

Examples of amphoteric surfactants include, but are not limited to, betaine amphoteric surfactants such as cocamidopropyl betaine, betaine lauryldimethylaminoacetate, lauramidopropyl betaine, and lauryl hydroxy sulfobetaine; amino acid amphoteric surfactants such as sodium β-laurylaminopropionate and sodium lauryldiaminoethylglycine; and amine oxide amphoteric surfactants such as decyldimethylamine oxide and lauryldimethylamine oxide.

One or more of these surfactants may be used. The amount of these surfactants other than the component (A) in the gel composition may be any amount, but is preferably 0% to 20% by mass, more preferably 1% to 10% by mass, in terms of the balance between cleaning power improvement and other properties.

Examples of the perfumes include, but are not limited to, natural perfumes and synthetic perfumes such as hydrocarbon perfumes, ether perfumes, ester perfumes, alcohol perfumes, aldehyde perfumes, and ketone perfumes.

Examples of natural perfumes include mint oil, orange oil, lemon oil, lemongrass oil, bergamot oil, ylang ylang oil, citronella oil, lemongrass oil, eucalyptus oil, geranium oil, lavender oil, rosemary oil, and jasmine oil. Examples of hydrocarbon perfumes include limonene, α-pinene, and camphene. Examples of ether perfumes include anethole, rose oxide, and cedrol methyl ether. Examples of ester perfumes include geranyl acetate, ethyl acetate, ethyl propionate, ethyl 2-methyl pentanoate, and citronellyl acetate. Examples of alcohol perfumes include geraniol, citronellol, and eugenol. Examples of aldehyde perfumes include citroranellal and benzaldehyde. Examples of ketone perfumes include methyl amyl ketone, acetoin, menthone, acetophenone, and benzylacetone.

The amount of perfume varies depending on the type and may be any amount. Typically, the amount is preferably about 1% to 15% by mass, more preferably 5% to 10% by mass. Within this range, a favorable scent can be smelled in a space where the gel composition is used.

Dyes may be added in order to visually recognize the life of a product when the toilet gel cleaner composition is continuously used. Preferred dyes are water-soluble legal dyes, examples of which include Red No. 2, Red No. 3, Red No. 102, Yellow No. 4, Yellow No. 5, Blue No. 1, Blue No. 2, Green No. 3, Orange No. 207, Blue No. 202, Blue No. 203, Blue No. 205, Brown No. 201, Orange No. 402, Violet No. 401, and Black No. 401. These may be used alone or as mixtures of various colors.

Examples of solvents other than water that can be used include, but are not limited to, alcohols such as ethanol, propanol, and butanol; polyhydric alcohols such as polyethylene glycol, polypropylene glycol, propylene glycol, dipropylene glycol, ethylene glycol, diethylene glycol, triethylene glycol, glycerol, 1,3-butylene glycol, sorbitol, polyoxyethylene glycerol, polyoxyethylene polyoxypropylene glycerol, and polyoxyethylene sorbitol; ketones such as methyl ethyl ketone and cyclohexanone; aromatic hydrocarbons such as toluene, xylene, and tetramethylbenzene; glycol ethers such as cellosolve, methyl cellosolve, butyl cellosolve, carbitol, methyl carbitol, butyl carbitol, propylene glycol monomethyl ether, propylene glycol monoethyl ether, dipropylene glycol diethyl ether, and triethylene glycol monoethyl ether; and acetic esters such as ethyl acetate, butyl acetate, cellosolve acetate, butyl cellosolve acetate, carbitol acetate, butyl carbitol acetate, propylene glycol monomethyl ether acetate, and dipropylene glycol monomethyl ether acetate. Of these, polyhydric alcohols are preferred, and glycerol and sorbitol are more preferred. These solvents are added as required in order to facilitate the dissolution of perfumes and other additives, and the amount thereof is preferably 1% to 10% by mass in the gel composition to provide enhanced whitening resistance while providing sufficient gel strength.

The gel composition of the present invention may contain, in addition to the above additives, additives such as oil solutions, salts, germicides, sanitizers, and preservatives, to the extent that the objects of the present invention can be achieved.

The gel composition of the present invention can be produced, for example, by mixing the water (B) with other additives (excluding perfumes) under stirring in a mixer, gradually adding the polyoxyalkylene alkyl ether (A) at 10° C. to 80° C. and mixing them, then adding a perfume to the mixture, and cooling the mixture as required.

The gel composition of the present invention is suitable for use for cleaning hard surfaces. Examples of hard surfaces include toilet bowls, wash-hand basins of toilets, kitchens, glasses, windows, doors, and bathrooms. In particular, the gel composition is suitable for use as a toilet bowl cleaner.

EXAMPLES

Examples of the present invention will now be described, but these examples are not intended to limit the present invention. In the following description, contents, concentrations, and other values are expressed in % by mass unless otherwise specified.

Production Example

Gel compositions according to formulas 1, 2, and 4 were obtained by the following method. Specifically, according to each of the compositions (parts by mass) shown in Table 1 below, an amphoteric surfactant (C-2) and a polyhydric alcohol (C-3) were mixed with water (B) using a mixer, and the mixture was heated to 70° C. A polyoxyalkylene alkyl ether (A) was gradually added to the mixture and mixed until homogeneous. In addition, (C-5) was added and mixed, and the mixture was cooled to obtain a gel composition.

A gel composition according to formula 3 was prepared in the same manner as described above except that the amphoteric surfactant (C-2) and a polyhydric alcohol (C-4) were mixed with the water (B) and the polyoxyalkylene alkyl ether (A) and a nonionic surfactant (C-1) were further added and mixed.

TABLE 1

| | For-mula 1 | For-mula 2 | For-mula 3 | For-mula 4 |
|---|---|---|---|---|
| | | | | (Parts by mass) |
| (A) Polyoxyalkylene alkyl ether | 30 | 20 | 20 | 50 |
| (B) Water | 45 | 60 | 45 | 25 |
| (C-1) Nonionic surfactant | — | — | 10 | — |
| (C-2) Amphoteric surfactant | 15 | 10 | 15 | 15 |
| (C-3) Polyhydric alcohol 1 | 5 | 5 | — | 5 |
| (C-4) Polyhydric alcohol 2 | — | — | 5 | — |
| (C-5) Perfume | 5 | 5 | 5 | 5 |
| Total | 100 | 100 | 100 | 100 |
| Water content (% by mass) | 55.7 | 67.1 | 55.7 | 35.7 |

The details of components in Table 1 are as follows.

(A) Polyoxyalkylene alkyl ether: those obtained by adding propylene oxide and ethylene oxide to any of the following alkyl alcohols according to the number of moles added and the configuration of addition shown in Table 2 were used.

Linear C12 alkyl alcohol: lauryl alcohol

Linear C14 alkyl alcohol: myristyl alcohol

Linear C16 alkyl alcohol: cetyl alcohol

Linear C18 alkyl alcohol: stearyl alcohol

Linear C22 alkyl alcohol: behenyl alcohol

Branched C18 alkyl alcohol: isooctadecanol (trade name: FINEOXOCOL 180, Nissan Chemical Industries, Ltd.)

(B): Water (C-1) Nonionic surfactant: polyoxyethylene polyoxypropylene glycol (trade name: EPAN U-108, DKS Co., Ltd.)

(C-2) Amphoteric surfactant: cocamidopropyl betaine (trade name: AMOGEN CB-H, DKS Co., Ltd., 29 mass % aqueous solution)

(C-3) Polyhydric alcohol 1: glycerol (C-4) Polyhydric alcohol 2: sorbitol (C-5) Perfume: limonene (Wako Pure Chemical Industries, Ltd.)

TABLE 2

| | Composition of (A) Component | | | | | Formula Number | Gel Strength (Hardness) | Whitening Resistance | Adhesion | High-Temperature Stability | Low-Temperature Stability |
| --- | --- | --- | --- | --- | --- | --- | --- | --- | --- | --- | --- |
| | R | m | n | m/n | m + n | Configuration of Addition | | | | | |
| Example 1 | linear C12 | 5 | 50 | 0.10 | 55 | block | 1 | B | A | Good | Good | Good |
| Example 2 | linear C14 | 10 | 50 | 0.20 | 60 | block | 1 | B | A | Good | Good | Good |
| Example 3 | linear C16 | 2 | 40 | 0.05 | 42 | block | 1 | A | B | Good | Good | Good |
| Example 4 | linear C16 | 5 | 25 | 0.20 | 30 | block | 1 | B | A | Good | Good | Good |
| Example 5 | linear C16 | 5 | 40 | 0.13 | 45 | block | 1 | A | A | Good | Good | Good |
| Example 6 | linear C16 | 10 | 40 | 0.25 | 50 | block | 3 | A | A | Good | Good | Good |
| Example 7 | linear C16 | 10 | 40 | 0.25 | 50 | block | 4 | A | A | Good | Good | Good |
| Example 8 | linear C16 | 10 | 60 | 0.17 | 70 | block | 2 | A | A | Good | Good | Good |
| Example 9 | linear C18 | 5 | 60 | 0.08 | 65 | block | 1 | A | A | Good | Good | Good |
| Example 10 | linear C18 | 10 | 30 | 0.33 | 40 | block | 1 | A | A | Good | Good | Good |
| Example 11 | linear C22 | 10 | 50 | 0.20 | 60 | block | 1 | A | B | Good | Good | Good |
| Comparative Example 1 | linear C16 | 0 | 40 | — | 40 | — | 1 | A | C | Poor | Poor | Good |
| Comparative Example 2 | linear C16 | 30 | 50 | 0.60 | 80 | block | 1 | C | A | Poor | Good | Good |
| Comparative Example 3 | linear C16 | 5 | 40 | 0.13 | 45 | random | 1 | D | B | Poor | Poor | Good |
| Comparative Example 4 | branched C18 | 10 | 40 | 0.25 | 50 | block | 1 | — | — | — | — | — |

The gel compositions obtained as described above were evaluated for gel strength (hardness), whitening resistance, adhesion, high-temperature stability, and low-temperature stability. The results are shown in Table 2. Evaluation methods are as follows.

<Gel Strength (Hardness)>

Each of the gel compositions was subjected to sensory evaluation by 10 panelists according to the following criteria and evaluated on the basis of its total score according to the following criteria.
(Sensory Evaluation)
 3: very hard, 2: hard, 1: somewhat soft, 0: soft
(Evaluation of Total Score)
 A: 25 or more, B: 15 to 24, C: 5 to 14, D: 4 or less <Whitening Resistance and Adhesion>

One gram of each of the gel compositions was applied to a glass slide. The glass slide was set upright and allowed to sit at 20° C. and 65% RH, and whitening resistance and adhesion were evaluated according to the following criteria. Setting the glass slide upright provided harsher conditions than on an inner sloping surface of a toilet bowl.
(Whitening Resistance)
 A: no whitening is observed after 48 hours
 B: no whitening is observed after 24 hours, but whitening is observed after 48 hours
 C: whitening is observed after 24 hours
(Adhesion)
 Good: adhering without being displaced after 24 hours
 Poor: slipped off the original position after 24 hours <High-Temperature Stability>

Thirty grams of each of the gel compositions was placed in a 50 mL screw-cap tube and allowed to sit at 60° C. for 6 hours. Subsequently, the screw-cap tube was laid on its side (90°) and allowed to sit for 10 seconds, and the gel state was then evaluated according to the following criteria.
 Good: remaining gel-like
 Poor: liquefied and flowable <Low-Temperature Stability>

Thirty grams of each of the gel compositions was placed in a 50 mL screw-cap tube and allowed to sit at 0° C. for 6 hours. Subsequently, the screw-cap tube was laid on its side (90°) and allowed to sit for 10 seconds, and the gel state was then evaluated according to the following criteria.
 Good: remaining gel-like
 Poor: liquefied and flowable As can be seen from Table 2, Examples 1 to 11 had high gel strength (hardness), high whitening resistance, high adhesion, high high-temperature stability, and high low-temperature stability.

In contrast, Comparative Example 1, in which the value of m of the polyoxyalkylene alkyl ether (A) represented by general formula (1) was 0, had low whitening resistance, low adhesion, and low high-temperature stability.

Comparative Example 2, in which the value of m of the polyoxyalkylene alkyl ether (A) represented by general formula (1) was 30, had low gel strength (hardness) and low adhesion.

Comparative Example 3, in which the configuration of addition of propylene oxide and ethylene oxide to the alkyl alcohol of the polyoxyalkylene alkyl ether (A) was random, had low gel strength (hardness), low adhesion, and low high-temperature stability.

Comparative Example 4 did not gel.

INDUSTRIAL APPLICABILITY

The gel composition of the present invention is suitable for use as a cleaner composition to be attached to hard surfaces in toilets, bathrooms, kitchens, and other places.

The invention claimed is:
1. A gel composition, comprising:
a polyoxyalkylene alkyl ether (A); and
water (B);
wherein:
the composition is free of calcium chloride and free of magnesium chloride; and
the polyoxyalkylene alkyl ether (A) is represented by formula (1):

$$R-O-(PO)_m\text{-}(EO)_n-H \qquad (1)$$

where:
R is a linear alkyl group having 12 to 22 carbon atoms;
PO represents an oxypropylene group;
EO represents an oxyethylene group;
m and n each represent an average number of moles added;

m is a number of 1 to 20;

n is a number of 1 to 80; and

PO and EO are added in a configuration of block addition.

2. The gel composition according to claim 1, wherein the polyoxyalkylene alkyl ether (A) is present in the gel composition in an amount of 10% to 50% by mass.

3. The gel composition according to claim 1, wherein water (B) is present in the gel composition in an amount of 35% to 75% by mass.

4. The gel composition according to claim 1, wherein a molar ratio of m to n (m/n) in formula (1) is 0.02 to 0.50.

5. The gel composition according to claim 1, wherein a sum of m and n (m+n) in formula (1) is 5 to 100.

6. A hard surface cleaner, comprising the gel composition according to claim 1.

7. The gel composition according to claim 2, wherein water (B) is present in the gel composition in an amount of 35% to 75% by mass.

8. The gel composition according to claim 1, wherein:
the polyoxyalkylene alkyl ether (A) is present in the gel composition in an amount of 10% to 50% by mass;
water (B) is present in the gel composition in an amount of 35% to 75% by mass;
a molar ratio of m to n (m/n) in formula (1) is 0.02 to 0.50; and
a sum of m and n (m+n) in formula (1) is 5 to 100.

9. The gel composition according to claim 8, wherein R is a linear alkyl group having 14 to 20 carbon atoms.

10. The gel composition according to claim 8, wherein R is a linear alkyl group having 16 to 18 carbon atoms.

11. The gel composition according to claim 8, wherein m is a number of 2 to 15.

12. The gel composition according to claim 8, wherein n is a number of 5 to 75.

13. The gel composition according to claim 8, wherein n is a number of 10 to 70.

14. The gel composition according to claim 8, wherein a molar ratio of m to n (m/n) in formula (1) is 0.05 to 0.40.

15. The gel composition according to claim 8, wherein a molar ratio of m to n (m/n) in formula (1) is 0.08 to 0.34.

16. The gel composition according to claim 8, wherein a sum of m and n (m+n) in formula (1) is 20 to 80.

17. The gel composition according to claim 8, wherein a sum of m and n (m+n) in formula (1) is 35 to 70.

18. The gel composition according to claim 8, wherein:
R is a linear alkyl group having 16 to 18 carbon atoms;
m is a number of 2 to 15;
n is a number of 10 to 70;
a molar ratio of m to n (m/n) in formula (1) is 0.08 to 0.34; and
a sum of m and n (m+n) in formula (1) is 35 to 70.

19. The gel composition according to claim 18, further comprising a surfactant other than (A), a polyhydric alcohol, and a perfume.

20. The gel composition according to claim 1, further comprising at least one of a surfactant other than (A), a polyhydric alcohol, and a perfume.

* * * * *